US011954775B2

(12) United States Patent
Cox et al.

(10) Patent No.: US 11,954,775 B2
(45) Date of Patent: Apr. 9, 2024

(54) ARTBOARD ELEMENT POSITIONING IN A SERIES OF COMPUTER-BASED ARTBOARDS

(71) Applicant: International Business Machines Corporation, Armonk, NY (US)

(72) Inventors: Benjamin David Cox, Newbury (GB); Andrew David Lyell, Winchester (GB); Joseph Sayer, Suffolk (GB)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/652,101

(22) Filed: Feb. 23, 2022

(65) Prior Publication Data

US 2023/0267662 A1  Aug. 24, 2023

(51) Int. Cl.
G06T 11/60 (2006.01)
G06T 7/73 (2017.01)

(52) U.S. Cl.
CPC .............. G06T 11/60 (2013.01); G06T 7/74 (2017.01); G06T 2200/24 (2013.01)

(58) Field of Classification Search
CPC ........ G06T 11/60; G06T 7/74; G06T 2200/24
See application file for complete search history.

(56) References Cited

U.S. PATENT DOCUMENTS 6,075,905 A   6/2000 Herman
10,114,916 B1 * 10/2018 Argollo ................. G06F 30/367
2007/0230770 A1 * 10/2007 Kulkarni .................... G06T 7/33
                                                    382/149
2014/0096039 A1   4/2014 Schultz
2014/0211933 A1 * 7/2014 Vymenets ............... G06Q 10/10
                                                    379/265.06
2015/0148969 A1 * 5/2015 Sasaki ...................... F24F 11/79
                                                    700/276
2016/0292133 A1   10/2016 Elings
2016/0314502 A1 * 10/2016 Lindsay ............. G06Q 30/0276
2018/0024901 A1 * 1/2018 Tankersley ....... G06Q 10/06393
                                                    707/694
2018/0093179 A1   4/2018 Gregory
2019/0043231 A1 * 2/2019 Uzgin ................... G06T 11/001
2019/0089960 A1 * 3/2019 Chen .................... H04N 19/176
2019/0333258 A1 * 10/2019 Salian ....................... G06F 8/34
2019/0354247 A1   11/2019 Edmunds (Continued)

OTHER PUBLICATIONS

Swearngin et al., "Rewire: Interface Design Assistance from Examples", Apr. 2018, ACM (Year: 2018).*

(Continued)

*Primary Examiner* — YuJang Tswei
(74) *Attorney, Agent, or Firm* — Stephanie L. Carusillo

(57) ABSTRACT

A method, computer program product, and computer system for artboard element positioning in a series of computer-based artboards. The method includes providing multiple target artboards and identifying a common element in at least some of the target artboards, where a common element has at least some consistent attributes. The method includes determining a reference position for the common element. The method includes, in each target artboard containing the common element, comparing an existing position of the common element with the reference position and determining whether to adjust the existing position to match the reference position.

20 Claims, 8 Drawing Sheets

(56) References Cited

U.S. PATENT DOCUMENTS

| | | | |
|---|---|---|---|
| 2020/0019583 A1 | 1/2020 | Halfond | |
| 2020/0118325 A1* | 4/2020 | Sasikumar | G06T 13/80 |
| 2020/0126212 A1* | 4/2020 | Duffy | G03F 7/70591 |
| 2020/0409668 A1 | 12/2020 | Eberlein | |
| 2021/0011690 A1* | 1/2021 | Gibson | G06F 8/33 |
| 2021/0217202 A1* | 7/2021 | Zakharchenko | H04N 19/597 |
| 2021/0409785 A1* | 12/2021 | Wang | H04N 19/132 |
| 2022/0159262 A1* | 5/2022 | Chen | H04N 19/105 |
| 2022/0166970 A1* | 5/2022 | Wang | H04N 19/159 |
| 2022/0208229 A1* | 6/2022 | Danila | G11B 27/34 |
| 2023/0141448 A1* | 5/2023 | Bv | G06F 40/194 |
| | | | 715/229 |

OTHER PUBLICATIONS

Schaadhardt et al, Understanding Blind Screen-Reader Users' Experiences of Digital Artboards—May 13, 2021—ACM (Year: 2021).*
Mariana et al, Closing the Gap Between Designers and Developers in a Low-Code Ecosystem—Jan. 2021, FCT, NOVA (Year: 2021).*
Mell et al., "The NIST Definition of Cloud Computing", NIST National Institute of Standards and Technology U.S. Department of Commerce, Special Publication 800-145, Sep. 2011, 7 pages.

* cited by examiner

ARTBOARD ELEMENT POSITIONING IN A SERIES OF COMPUTER-BASED ARTBOARDS

BACKGROUND

The present invention relates to visual design editing, and more specifically, to artboard element positioning in a series of computer-based artboards.

When working on a computer-based visual design tool, a user may create multiple artboards in a work product, which represent a series of representations that make up a user journey. A user journey is the step by step journey that a user takes to reach their goal. This journey will often consist of a number of artboards with decision points that carry the user from one step to another. The user may have to create hundreds of artboards to represent a user journey. Artboards may be, for example, screens, slides, webpages, etc.

Typically, a series of screens will have consistent user interface (UI) elements that remain in fixed locations throughout the user journey (for example, in each screen a company logo and tag line may stay present in the top left corner of the screen). When working with many screens in this way, "component creep" can occur where these elements are at different (x, y) coordinates between screens. When working on a work product that needs consistency throughout, it can be difficult and often an afterthought to maintain positioning of elements across multiple screens.

With hundreds of screens, inconsistencies can often occur. For example, when re-positioning elements, mistakes can be made, and accidental movement of elements only becomes apparent when reviewing the user journey. If left unresolved, this issue can be distracting when user-testing the screens because supposedly static elements on a screen can be seen to move, distracting users from their intended task. Similarly, it can be confusing for a web developer to start building from these files and having multiple screens with elements appearing in different (x, y) co-ordinates.

It can be incredibly time consuming to return to each screen of the user journey and put elements into the correct place.

Another scenario may be when a user is creating a presentation and wanting to ensure repeating elements remain in the same location throughout the slides.

SUMMARY

According to an aspect of the present invention there is provided a computer-implemented method for artboard element positioning in a series of computer-based artboards, said method comprising: providing multiple target artboards; identifying a common element in at least some of the target artboards, wherein a common element has at least some consistent attributes; determining a reference position for the common element; and in each target artboard containing the common element: comparing an existing position of the common element with the reference position and determining whether to adjust the existing position to match the reference position.

According to another aspect of the present invention there is provided a system for artboard element positioning in a series of computer-based artboards, comprising: a processor and a memory configured to provide computer program instructions to the processor to execute the function of the components including: an artboard component for providing multiple target artboards; an element identifying component for identifying a common element in at least some of the target artboards, wherein a common element has at least some consistent attributes; a reference position component for determining a reference position for the common element; a position comparing component for, in each target artboard containing the common element, comparing an existing position of the common element with the reference position; and an adjustment determining component for, in each target artboard containing the common element, determining whether to adjust the existing position to match the reference position.

According to a further aspect of the present invention there is provided a computer program product for artboard element positioning in a series of computer-based artboards, the computer program product comprising a computer readable storage medium having program instructions embodied therewith, the program instructions executable by a processor to cause the processor to: provide multiple target artboards; identify a common element in at least some of the target artboards, wherein a common element has at least some consistent attributes; determine a reference position for the common element; and in each target artboard containing the common element: compare an existing position of the common element with the reference position and determine whether to adjust the existing position to match the reference position.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for artboard element positioning in a series of computer-based artboards. The term "artboard" is used for an on-screen design surface in a drawing or design application. A series of artboards may be provided, as examples, as screens of an application, pages of a website, slides of a presentation, etc. Another example of a series of artboards may be physical designs, such as engineering, architectural, or industrial design drawings. "Elements" of an artboard may include user interface elements or controls, design or drawing shapes, physical design tool artifacts, or other editable elements of the artboard.

The method receives multiple target artboards in a series and identifies a common element in at least some of the target artboards. This is carried out for each common element across the artboards in the series. A common element has at least some consistent attributes across the multiple target artboards, such as a common size, color, content, etc. The commonality may be influenced by a position of the element. For example, similarly placed elements in different artboards with consistent attributes are more likely to be common elements than differently placed elements. Parameters for identifying common elements may be configured by a user.

The method determines a reference position for the common element as the position that the common element should be located within the artboard. The reference position may be the coordinates of vertices of the element. The position may be defined by reference to the artboard dimensions or boundaries. The position may also be defined with reference to other elements in the artboard.

In each target artboard containing the common element, the existing position of the common element is compared with the reference position and it is determined whether to adjust the existing position to match the reference position.

The automated position correction in design editing tools is an improvement in the technical field of design editing.

Figure 1:
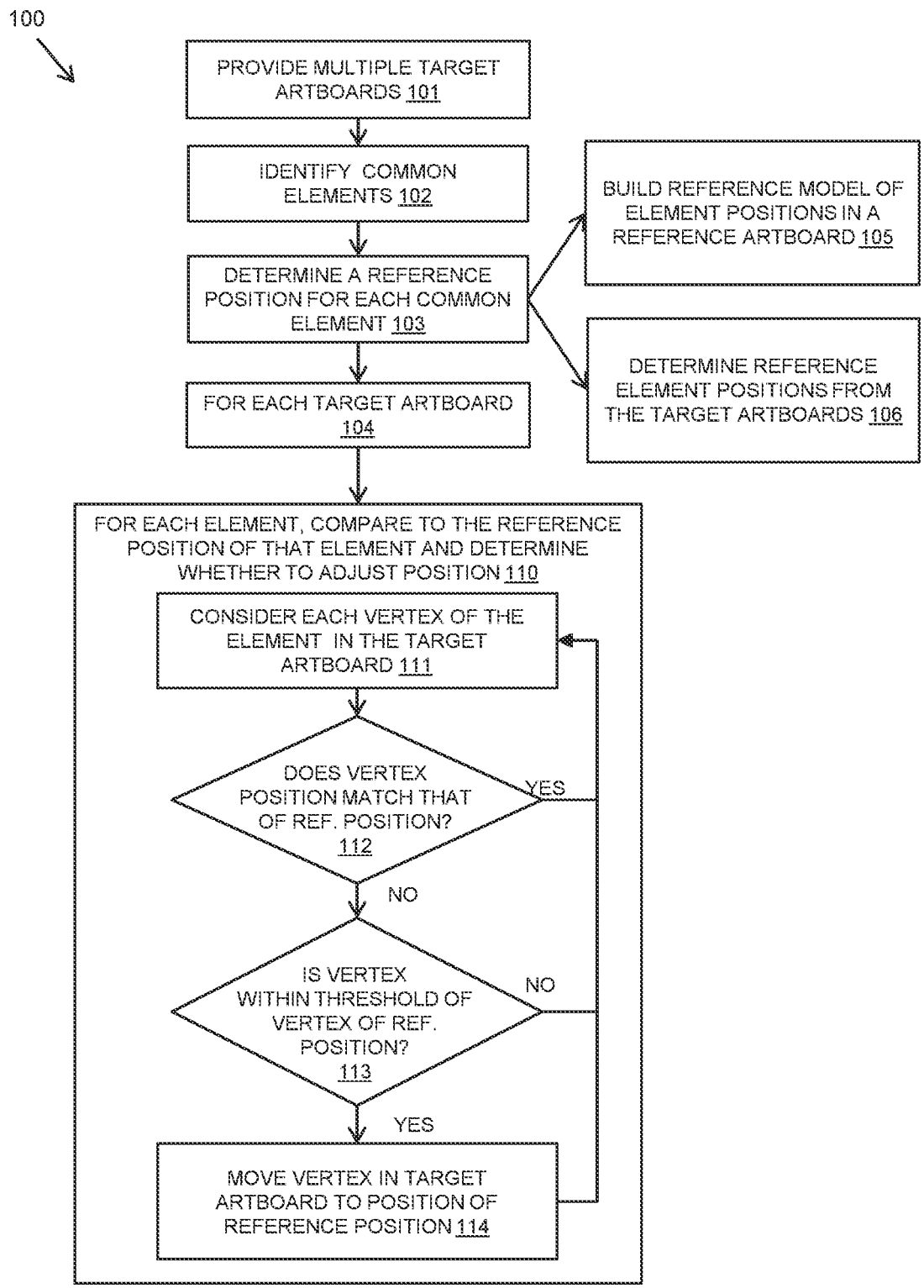
FIG. 1 is a flow diagram of an example embodiment of a method in accordance with embodiments of the present invention.

Referring to FIG. 1, a flow diagram 100 shows an example embodiment of the described method for artboard element positioning in a series of computer-based artboards. The method may be provided as part of a design editing tool or as additional functionality provided remotely.

The method includes providing 101 multiple target artboards. These may be selected by a user when generating or editing a series of artboards as a subset or these may be the full set of the artboards. Alternatively, the artboards may be automatically provided when a series of artboards is generated or edited.

The method may identify 102 a common element in at least some of the target artboards. Multiple common elements may be identified across different sets of the target artboards in the series. This may be automated to identify elements with at least some consistent attributes, such as color, size, text, etc. The identification may take into account a position of the elements, which may influence the commonality. Identifying 102 a common element may include applying a configured positional variance when looking for the consistent attributes. For example, if there is a blue button with a label 'OK' at the top-left of a first artboard and a button of a similar look at the bottom-right of a second artboard, these are unlikely to be a common element. Whereas if the buttons were at similar positions in the two artboards, these are likely be a common element.

The parameters for identification of common elements may be configured by a user to determine the parameters for consistency between attributes and positional variation.

The method may determine 103 a reference position for the common element. This is the position that is determined as the correct position for the common element across the artboards. A common element may have multiple reference position points that form its overall reference position. A common element may have a single reference position point and a reference size. The reference positions may be provided in relation to the artboard borders and/or other elements. In the example case of a shape with corners, each vertex of the common element may have a reference position. In the example case of a circular element, the center point may have a reference position with a reference size of diameter.

In one embodiment, a reference model of element positions may be built 105 as a reference artboard and a user may select the desired position of each element. Such a reference artboard may be generated during or after the series of artboards is created or edited, such that the common elements across the artboards may be moved at any time to conform to an updated reference position as required by the user.

Reference element positions may be automatically determined 106 from the target artboard positions by averaging the positions of the common element in the target artboards. For example, a modal position of the positions in the target artboards may be selected as the reference position. This may be combined with the use of a reference artboard so that automatically determined reference positions can be altered by a user. Alternatively, this automatic reference positioning may be carried out directly without a reference artboard.

For each target artboard 104, each common element is compared 110 by comparing the reference position of the common element to an existing position of the common element and a determination is made as to whether to adjust the existing position to match the reference position.

In one example embodiment a sub-process is carried out as shown in FIG. 1. In this example, each vertex of the element in the target artboard is considered 111. It is determined 112 if the vertex position matches that of the reference position. If it matches, no adjustment is required and the sub-process loops to consider a next vertex. If the position does not match, then it is determined 113 if the vertex is within a threshold tolerance of the vertex reference position. If the vertex position is not within the tolerance, then no adjustment is made and the sub-process loops to consider a next vertex. However, if the vertex position is within the tolerance, the vertex in the target artboard is moved 114 to the reference position. Again, the sub-process then loops to consider the next vertex.

This threshold tolerance may be applied to ensure that the common elements are only moved if they are sufficiently close to the reference position. If they are outside the tolerance, they may be intended to be in a different position. The tolerance may be configured and adjusted by the user.

As an alternative to considering each vertex of a common element, a single reference point and a size of the element may be compared.

The method may include prompting user confirmation before adjusting the existing position to match the reference position.

Figure 2:
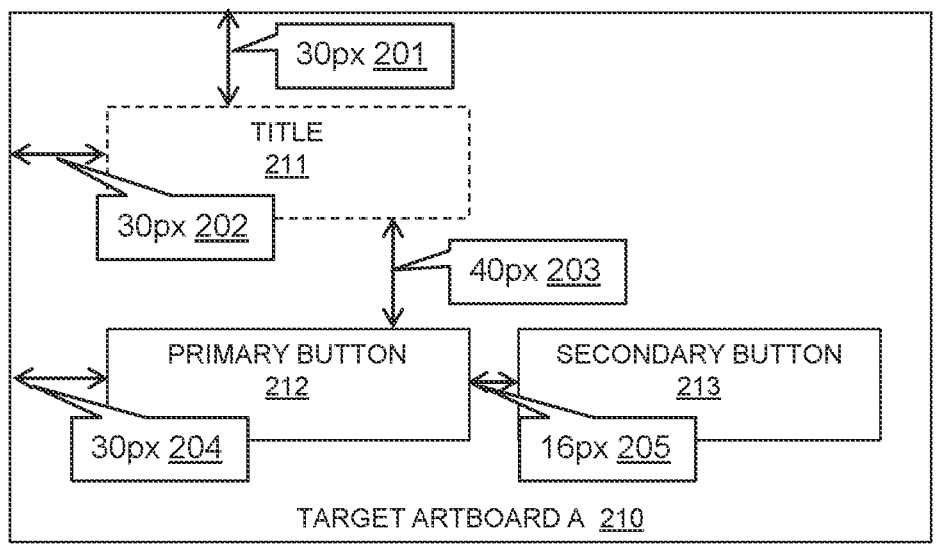
FIG. 2 is a schematic diagram of three example target artboards with common elements in accordance with embodiments of the present invention.
Figure 2:
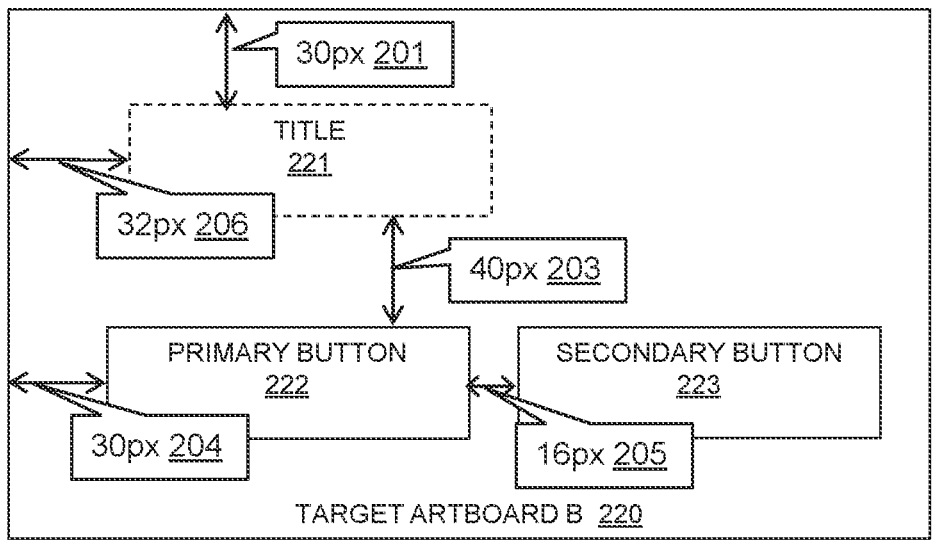
Figure 2:
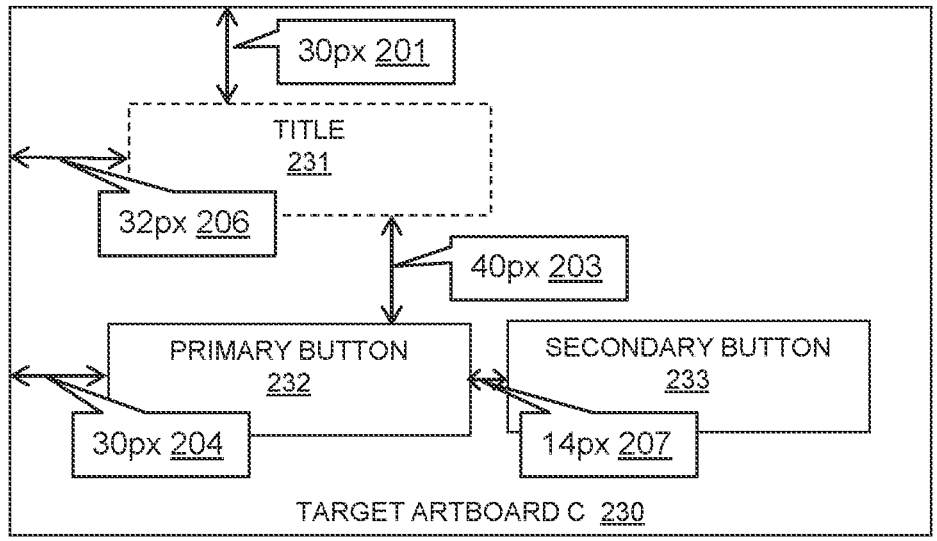

Referring to FIG. 2, an example is illustrated that includes three target artboards, A 210, B 220, C 230, in a series of artboards in the form of web pages in which element gradually creep from their intended positions. The target artboards A 210, B 220, C 230 include three common elements, a title 211, 221, 231, a primary button 212, 222, 232, and a secondary button 213, 223, 233. The positions of the common elements gradually creep as the artboards progress from the first artboard A 210 to the third artboard C 230.

The position of the first common element of the title 211 is positioned in artboard A 210 at 30 pixels 201 from the top border of the artboard A 210, 30 pixels 202 from the left border of the artboard A 210, and 40 pixels 203 above the primary button 212. This shifts in artboard B 220 to be 32 pixels 206 from the left border of the artboard B 220.

The position of the second common element of the primary button 212 is positioned in artboard A 210 at 40 pixels 203 below the title 211, 30 pixels 204 from the left border of the artboard A 210, and 16 pixels 205 from the secondary button 213. This is constant in artboard B 220 but shifts in artboard C 230 to be 14 pixels 207 from the secondary button 213.

Figure 3A:
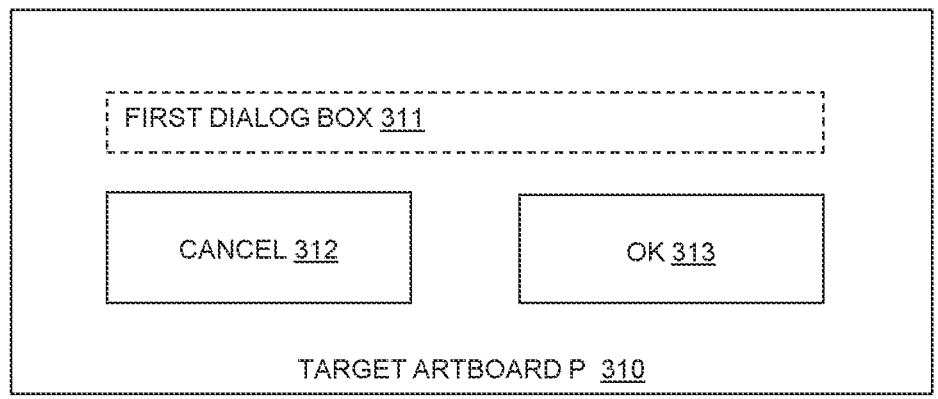
FIG. 3A to 3F are schematic diagrams of target artboards and a reference artboard in accordance with embodiments of the present invention.
Figure 3B:
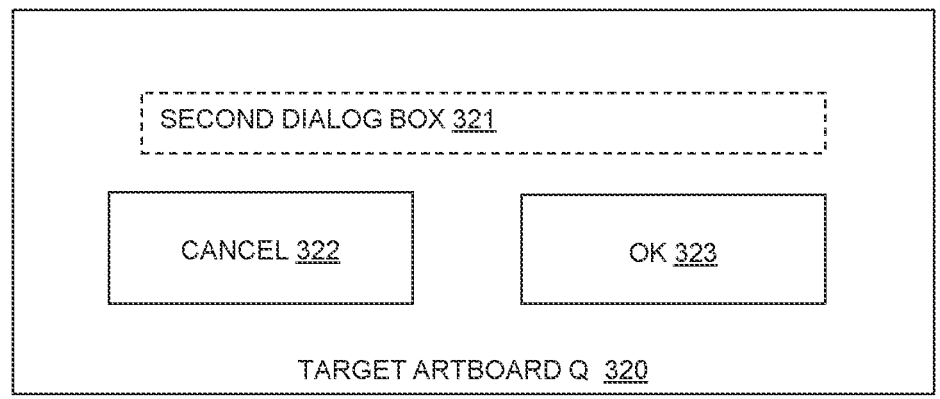

Referring to FIGS. 3A and 3B, two target artboards are shown from a series of artboards. Target artboard P 310 is shown in FIG. 3A and target artboard Q 320 is shown in FIG. 3B. Target artboard P 310 has a first dialog box 311 to be answered, a "cancel" button 312, and an "OK" button 313. Target artboard Q 320 has a second dialog box 321 to be answered, a "cancel" button 322, and an "OK" button 323. The first dialog box 311 and the second dialog box 312 are determined to be common elements as they share a number of attributes even though their text content is different.

Figure 3C:
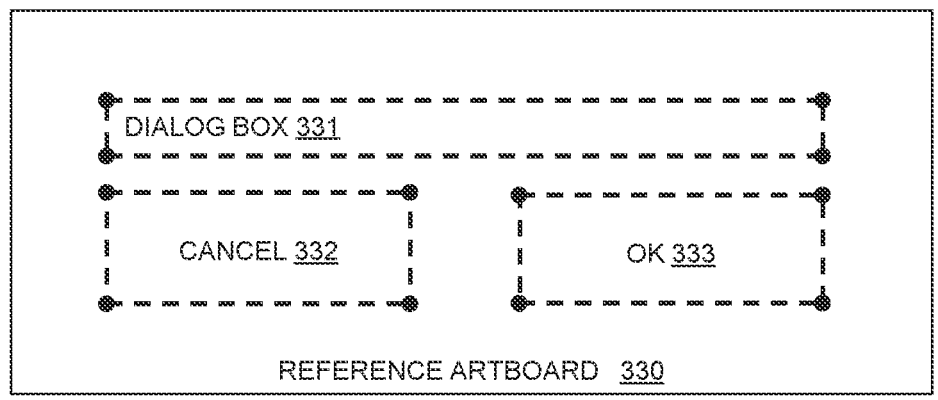

FIG. 3C shows a reference artboard 330 marked-up with positional references for the elements of the dialog box 331, "cancel" button 332, and "OK" button 333. The positional references are in the form of coordinates of each vertex of the elements. The reference positions may be detected or may be given by a user, for example, as (x, y) coordinates in relation to the dimensions and board of the artboard and/or as distances from the artboard borders and other elements.

Figure 3D:
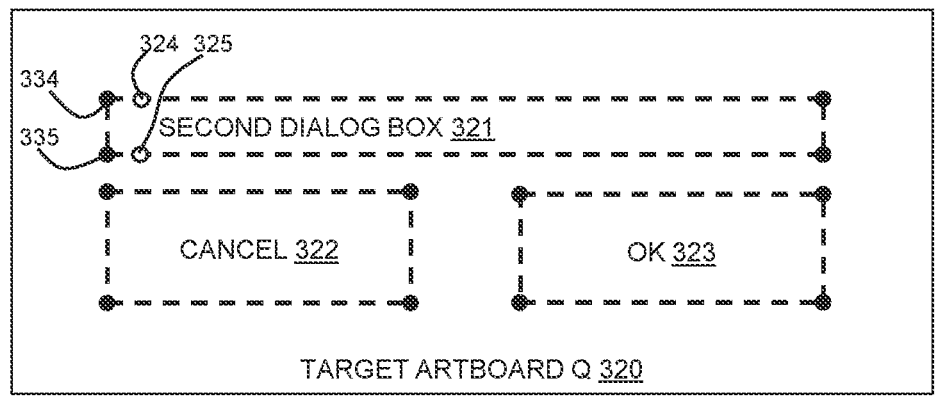
Figure 3E:
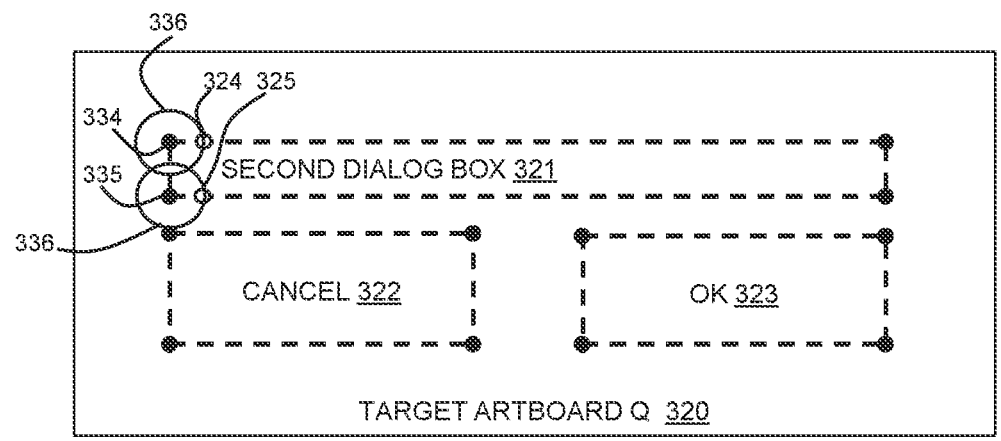
Figure 3F:
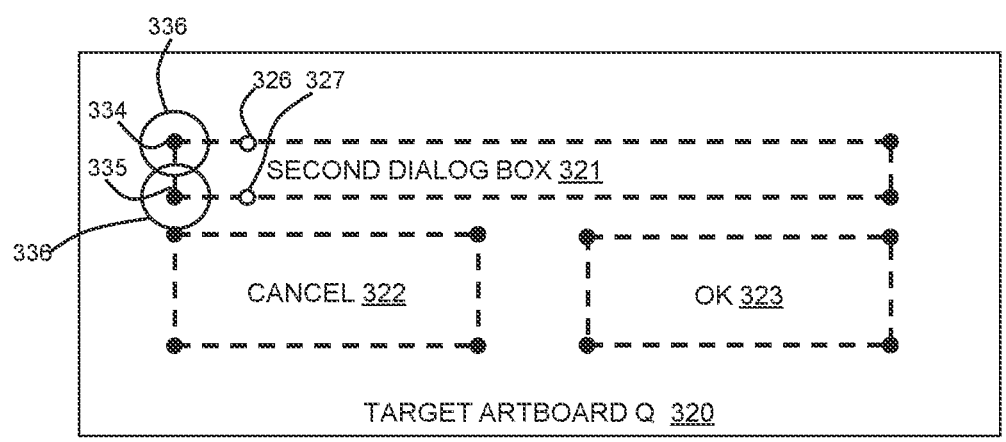

Referring to FIGS. 3D to 3F, the target artboard Q 320 is compared to the reference artboard 330 (from FIG. 3C) and the reference positions are compared. As shown in FIG. 3D, the position of the second dialog box 321 does not match the reference positions of the dialog box 331 of the reference artboard 330 as the two left vertices 324, 325 of the second dialog box 321 do not match the reference position vertices 334, 335.

A threshold tolerance 336 is shown for the reference vertices 334, 335 in FIG. 3E and FIG. 3F. The tolerance 336 may be, for example, a 6-pixel radius around a reference vertex.

The version of target artboard Q 320 shown in FIG. 3E has left vertices 324, 325 that fall within the tolerance 336. Therefore, the left vertices 324, 325 are adjusted to move them to the reference positions 334, 335. A prompt may be sent to the user to confirm the move and adjust the position and size of the dialog box 321.

The version of the target artboard Q 320 shown in FIG. 3F has left vertices 326, 327 that are further away from the reference vertices 334, 335 and therefore fall outside the tolerance 336. Therefore, the left vertices 326, 327 are not adjusted as this may be an intentional deviation. A notification may be sent to the user to confirm that the vertices should not be moved.

The described method provides for automatically aligning elements to rectify creeping inconsistencies across a series of artboards. Applying the method ensures the position of elements intended to remain in a consistent location on the artboards can be made consistent with considerable ease. This may be incorporated into a visual design tool or provided as an additional plug-in functionality.

The method may create a list of common elements in a series of artboards of a work product. For example, the common elements may have consistent attributes like color, composition [text+rectangle], and bevels) and the method may then create a map of the positioning of these elements.

The method may then be able to suggest or decide a consistent view on the screen for these components as a single unit of work. For example, in the case of 100 screens with user interface (UI) elements that have suffered from component creep, the method may decide a consistent positioning for those elements for all 100 screens based on positions through the work product.

The main advantage of this approach is the amount of time saved compared to other solutions. For example, a user could manually look through each screen checking the coordinates of each UI element and adjusting appropriately. Alternatively, a user could define the locations of a particular UI elements in the first screen, lock that UI element, then duplicate that artboard to ensure consistency. These approaches do not provide a flexible approach if the user wishes to move an element in the future.

In the case of presentation software, presentation slide masters may be used to ensure all titles appear in the same location throughout the presentation. A user will set the location of a title in the slide master, then all slides created from this master will have that consistent title. This differs from the described method as it requires an upfront setup, and will not rectify discrepancies throughout the artboards (or in this case slides) that have already been created.

Where positional data of a target element is within a certain threshold of positional data of a reference element, the positional data of the target element is moved to be the same as that of the reference element, optionally asking for user confirmation.

In some embodiments, the method may determine the modal (the most common) positioning of an element across all the artboards, then adjust the positional data so that it is consistent across all artboards. This may be an alternative or addition to using a reference artboard. Elements may be selected that are positioned within a configured threshold of one another across the artboards, the most common positioning is identified, and then the method may automatically change the positional data of the elements to be the same across all artboards.

The method may be applied with a simple selection of the functionality to align and position all elements to achieve the correct component alignment.

Figure 4:
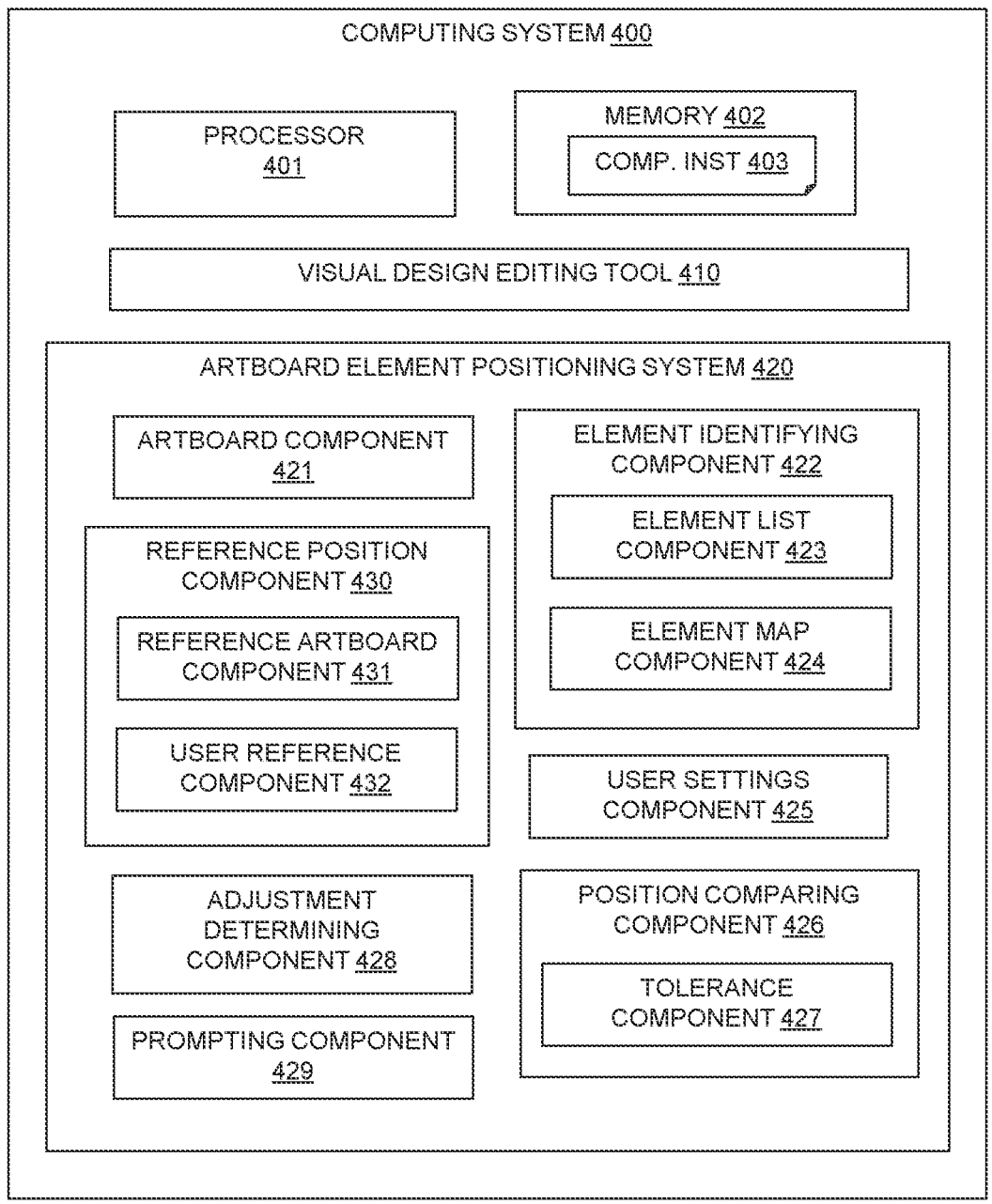
FIG. 4 is block diagram of an example embodiment of a system in accordance with embodiments of the present invention.

Referring to FIG. 4, a block diagram shows an example embodiment of a computing system 400 in which an artboard element positioning system 420 may be provided.

The computing system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The artboard element positioning system 420 may be provided as an extension to a visual design editing tool 410 by being incorporated into the tool 410 or as a remotely-provided extension.

The artboard element positioning system 420 includes an artboard component 421 for providing multiple target artboards in which elements are to be conformingly positioned.

The artboard element positioning system 420 includes an element identifying component 422 for identifying a common element in at least some of the target artboards, where a common element has at least some consistent attributes. The consistency of the attributes required for elements to be considered to be common elements may be configured in a user settings component 425 of the artboard element positioning system 420. The element identifying component 422 may include an element list component 423 for creating a list of all the common elements across the multiple target artboards and an element map component 424 for creating a map of the coordinates of the existing positions of the common elements.

The artboard element positioning system 420 includes a reference position component 430 for determining a reference position for the common element. The reference position component 430 may include a reference artboard component 431 for building a reference artboard including specified reference positions of one or more common elements. The reference artboard component 430 may include a user reference component 432 for selecting the specified reference positions by a user. The reference position component 430 may include an averaging component for using the existing positions of the common element in a plurality of the target artboards to determine the reference position.

The artboard element positioning system 420 includes a position comparing component 426 for, in each target artboard containing the common element, comparing an existing position of the common element with the reference position. The position comparing component 426 may include a tolerance component 427 for determining if the existing position is within a threshold tolerance of the reference position.

The artboard element positioning system 420 includes an adjustment determining component 428 for, in each target artboard containing the common element, determining whether to adjust the existing position to match the reference position. The adjustment determining component 428 may only adjust the existing position if it is within a threshold tolerance.

The artboard element positioning system 420 includes a prompting component 429 for prompting user confirmation before adjusting the existing position to match the reference position.

Figure 5:
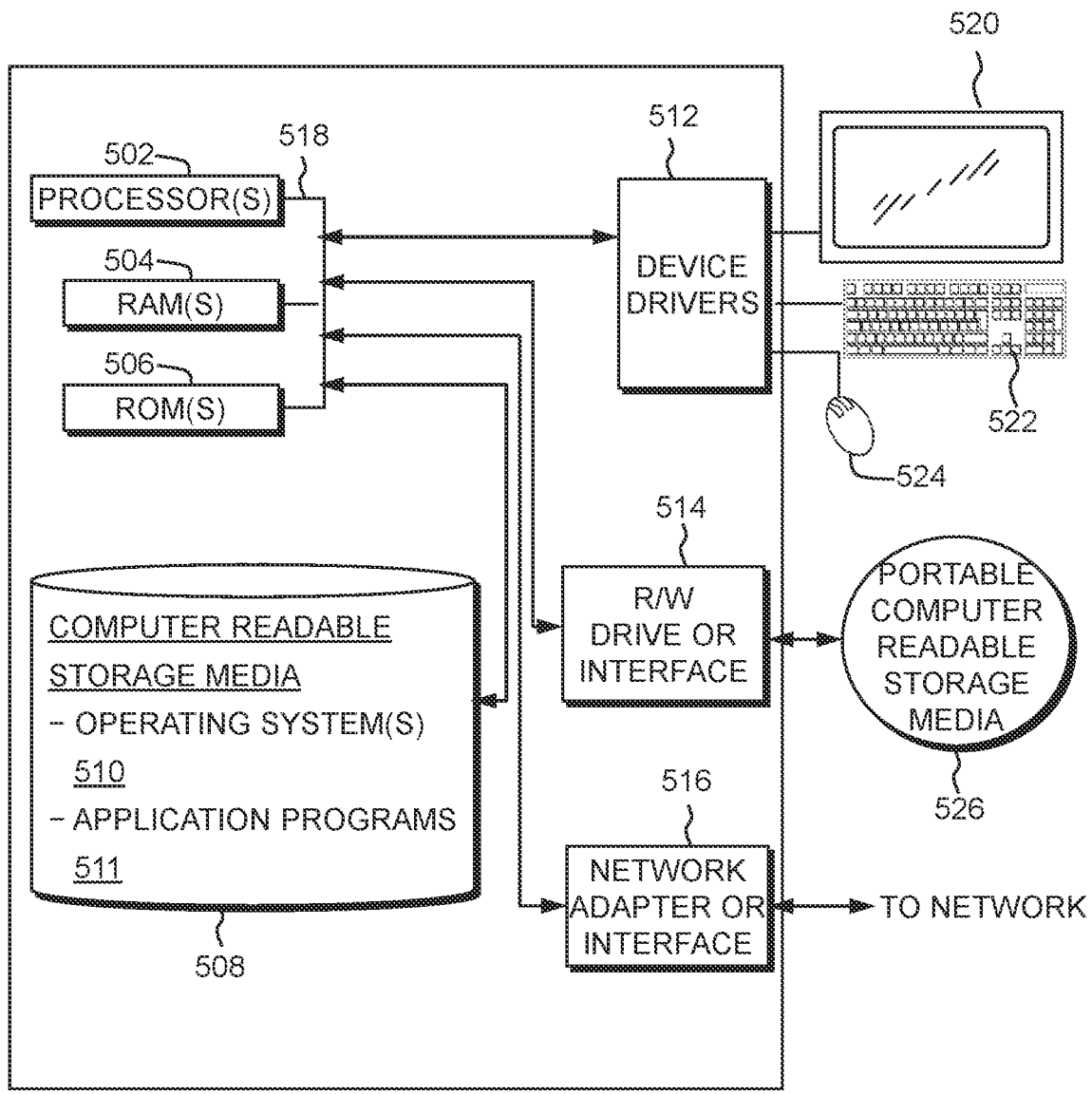
FIG. 5 is a block diagram of an embodiment of a computer system or cloud server in which embodiments of the present invention may be implemented.

FIG. 5 depicts a block diagram of components of a computing system as used for the artboard element positioning system 420, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a RAY drive or interface 514 to read from and write to one or more portable computer readable storage media 526. Application programs 511 on the computing system can be stored on one or more of the portable computer readable storage media 526, read via the respective RAY drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
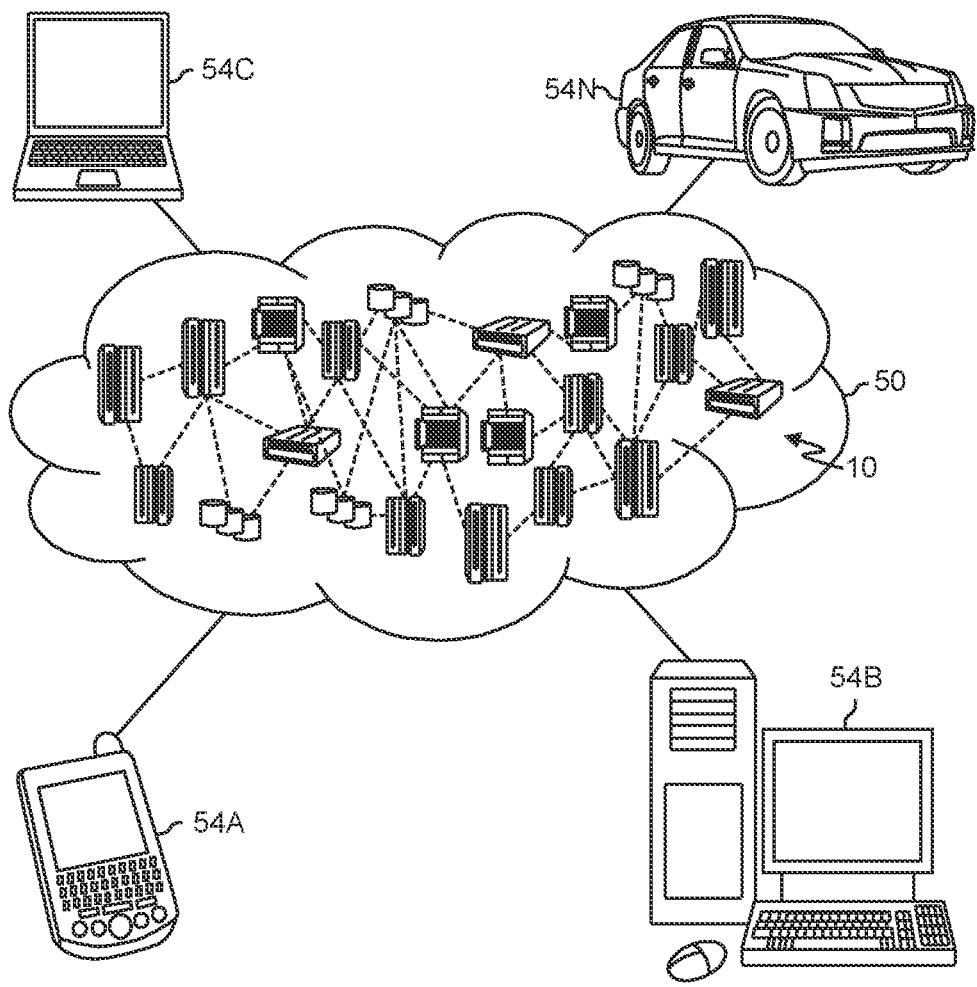
FIG. 6 is a schematic diagram of a cloud computing environment in which embodiments of the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
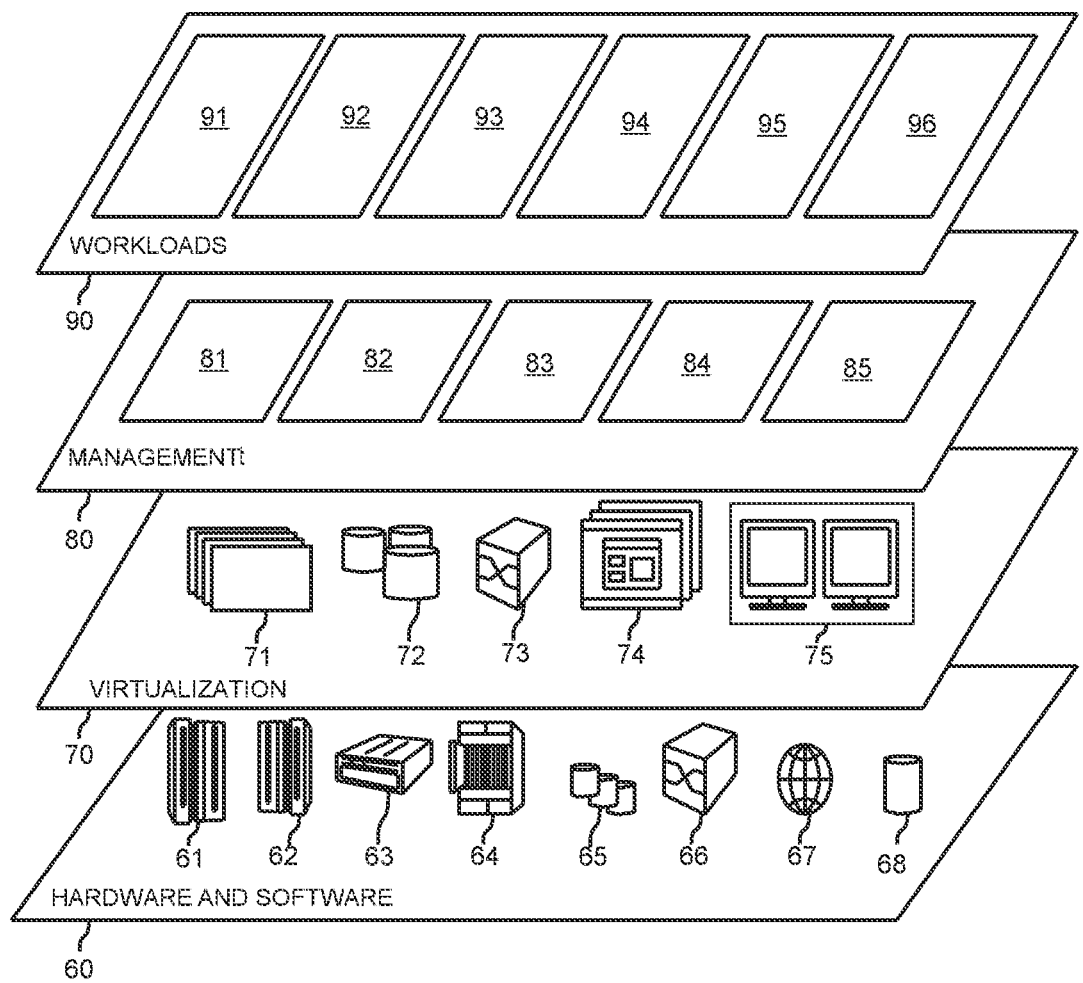
FIG. 7 is a diagram of abstraction model layers of a cloud computing environment in which embodiments of the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and artboard element processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for artboard element positioning in a series of computer-based artboards, said method comprising:
   providing multiple target artboards with a plurality of elements on the multiple target artboards;
   identifying a common element of the plurality of elements in at least two of the multiple target artboards, wherein the common element is an editable element that has consistent attributes across the at least two multiple target artboards;
   determining a reference position for the common element, wherein the reference position is a set position to be used for the common element on each of the multiple target artboards; and
   in each target artboard of the at least two of the multiple target artboards containing the common element:
      comparing an existing position of the common element with the reference position,
      determining whether the existing position matches the reference position, and
      responsive to determining the existing position does not match the reference position, adjusting the existing position of the common element to the reference position.

2. The method of claim 1, wherein identifying a common element includes identifying common elements within a configured positional variance.

3. The method of claim 1, wherein a position of a common element is a vertex of the element and wherein comparing an existing position of the common element is carried out for each vertex of the common element.

4. The method of claim 1, wherein comparing an existing position of the common element with the reference position includes determining if the existing position is within a threshold tolerance of the reference position, and wherein determining whether to adjust the existing position is based on the threshold tolerance.

5. The method of claim 1, further comprising:
   prompting user confirmation before adjusting the existing position to match the reference position.

6. The method of claim 1, wherein determining a reference position of the common element includes building a reference artboard including specified reference positions of one or more common elements.

7. The method of claim 6, wherein the specified reference positions are selected by a user.

8. The method of claim 1, wherein determining a reference position of the common element includes using the existing positions of the common element in the at least two of the multiple target artboards to determine the reference position.

9. The method of claim 8, wherein using the existing positions of the common element in the at least two of the multiple target artboards uses the modal of the existing positions as the reference position.

10. The method of claim 1, further comprising:
    creating a list of all the common elements across the multiple target artboards; and
    creating a map of the coordinates of the existing positions of the common elements.

11. A system for artboard element positioning in a series of computer-based artboards, said system comprising:
    a processor and a memory configured to provide computer program instructions to the processor to execute the function of the components including:
       an artboard component for providing multiple target artboards with a plurality of elements on the multiple target artboards;
       an element identifying component for identifying a common element of the plurality of elements in at least two of the multiple target artboards, wherein the common element is an editable element that has consistent attributes across the at least two multiple target artboards;
       a reference position component for determining a reference position for the common element, wherein the reference position is a set position to be used for the common element on each of the multiple target artboards;
       a position comparing component for, in each target artboard of the at least two of the multiple target artboards containing the common element, comparing an existing position of the common element with the reference position;
       a match determining component for, in each target artboard of the at least two of the multiple target artboards containing the common element, determining whether the existing position matches the reference position;
       an adjustment component for, in each target artboard of the at least two of the multiple target artboards containing the common element, responsive to determining the existing position does not match the reference position, adjusting the existing position of the common element to the reference position.

12. The system of claim 11, wherein a position of a common element is a vertex of the element and wherein the position comparing component is for comparing an existing position of the common element for each vertex of the common element.

13. The system of claim 11, wherein the position comparing component includes a tolerance component for determining if the existing position is within a threshold tolerance of the reference position and wherein the adjustment determining component only adjusts the existing position if it is within the threshold tolerance.

14. The system of claim 11, further comprising:
a prompting component for prompting user confirmation before adjusting the existing position to match the reference position.

15. The system of claim 11, wherein the reference position component includes a reference artboard component for building a reference artboard including specified reference positions of one or more common elements.

16. The system of claim 15, wherein the reference artboard component includes a user reference component for selecting the specified reference positions by a user.

17. The system of claim 15, wherein the reference position component includes an averaging component for using the existing positions of the common element in the at least two of the target artboards to determine the reference position.

18. The system of claim 11, further comprising:
a common element list component for creating a list of all the common elements across the multiple target artboards; and
a common element map component for creating a map of the coordinates of the existing positions of the common elements.

19. The system of claim 11, wherein the system is provided for access by a visual design tool.

20. A computer program product for artboard element positioning in a series of computer-based artboards, the computer program product comprising a computer readable storage medium having program instructions embodied therewith, the program instructions executable by a processor to cause the processor to:
provide multiple target artboards with a plurality of elements on the multiple target artboards;
identify a common element of the plurality of elements in at least two of the multiple target artboards, wherein the common element is an editable element that has consistent attributes across the at least two multiple target artboards;
determine a reference position for the common element, wherein the reference position is a set position to be used for the common element on each of the multiple target artboards; and
in each target artboard of the at least two of the multiple target artboards containing the common element:
compare an existing position of the common element with the reference position,
determine whether the existing position matches the reference position, and
responsive to determining the existing position does not match the reference position, adjust the existing position of the common element to the reference position.

* * * * *